F. W. WHITNEY.
CARRIAGE-TOP.

No. 176,106. Patented April 11, 1876.

Witnesses.
W. B Masson
Edmund Masson

Inventor.
Francis W. Whitney
By Atty A. B. Stoughton

UNITED STATES PATENT OFFICE.

FRANCIS W. WHITNEY, OF LEOMINSTER, MASSACHUSETTS, ASSIGNOR TO F. A. WHITNEY CARRIAGE COMPANY, OF SAME PLACE.

IMPROVEMENT IN CARRIAGE-TOPS.

Specification forming part of Letters Patent No. 176,106, dated April 11, 1876; application filed December 9, 1875.

*To all whom it may concern:*

Be it known that I, FRANCIS W. WHITNEY, of Leominster, in the county of Worcester and State of Massachusetts, have invented certain new and useful Improvements in Standard-Irons for Canopy-Top Carriages; and I do hereby declare the following to be a full, clear, and exact description of the same, reference being had to the accompanying drawings, making a part of this specification, in which—

Figure 1:
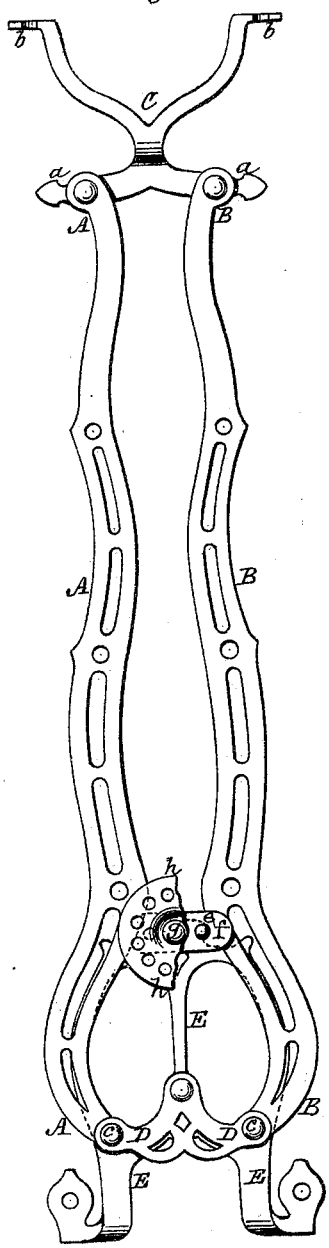
Figure 2:
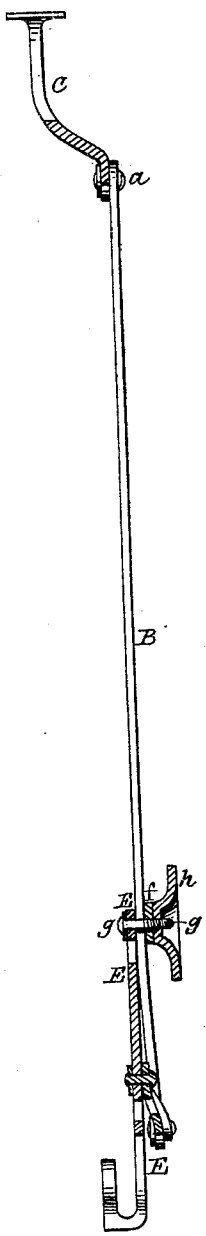
Figure 3:
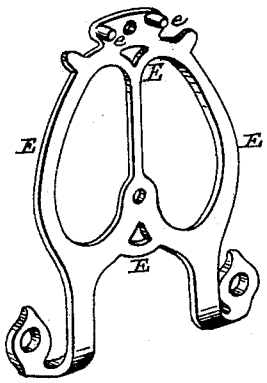

Figure 1 represents a front view of the standard-iron, showing a portion of the knob or thumb-screw as broken away to allow the part behind it to be better seen. Fig. 2 represents a vertical section through the standard, and Fig. 3 represents the base-piece in perspective, and separated from the uprights.

My invention consists in the particular manner in which I attach the parallel hinged upright bars to the base-piece, so that they may be adjusted thereto, and in being adjusted to also adjust the canopy-top supported by them, and hold the top in any desired position.

The parallel upright bars A B are hinged or pivoted at their upper ends to the ends of the legs $a\ a$ of a spider-frame, C, and to the other legs, $b\ b$, of said frame the canopy is permanently attached. The lower ends of the bars A B are pivoted, as at $c\ c$, to a yoke or link, D, so that by this pivoted connection the bars A B may have a parallel movement in relation to each other. The base-piece E, which is fastened to the carriage-body and supports the uprights and the canopy, is shown in position in Figs. 1 and 2, and separately in Fig. 3. At or near the top of the base-piece E are cast or otherwise formed two teats, $e\ e$, to or by which a cross-piece, $f$, is connected to the base-piece, said cross-piece coming in front of the bars A B, and lapping over a little upon them, as seen in Fig. 1, so as to serve as a clamp for holding the bars and the canopy when the latter has been adjusted. Through the top of the base-piece, and through the cross-bar $f$, there may be passed a screw, $g$, upon which there is run a knob or thumb-nut, $h$, to clamp the base and uprights together. Other clamping mechanism well known to mechanicians may be used instead of the screw and thumb-nut; but the latter is simple, and the nut may be arranged so as not to drop off entirely, should it ever become loose; and by this same screw $g$ the uprights A B are held to the base-piece E.

Having thus described my invention, what I claim is—

In combination with the uprights or standards A B, pivoted at both their upper and lower ends to cross-arms, so as to have a parallel movement, the base-piece E, to which said standards are also pivoted, and by which they are supported, and may be clamped by the thumb-nut to set the canopy in any desired position, as described and represented.

FRANCIS W. WHITNEY.

Witnesses:
C. H. MERRIAM,
GEORGE ENGLAND.